(No Model.)
H. COMSTOCK.
PNEUMATIC TIRE.
No. 491,010. Patented Jan. 31, 1893.
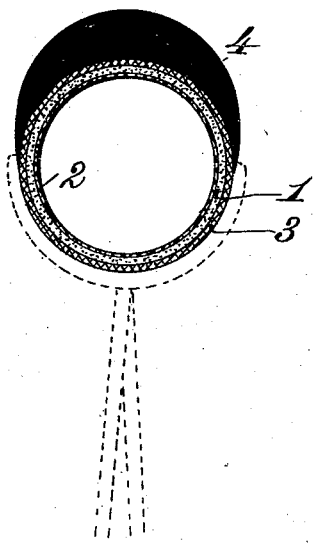
Witnesses.
Inventor.
Harry Comstock.
By
James L. Norris.
Atty.

UNITED STATES PATENT OFFICE.

HARRY COMSTOCK, OF FULTON, NEW YORK, ASSIGNOR OF ONE-HALF TO WILLIAM J. WATSON, OF SAME PLACE.

PNEUMATIC TIRE.

SPECIFICATION forming part of Letters Patent No. 491,010, dated January 31, 1893.

Application filed July 19, 1892. Serial No. 440,497. (No model.)

*To all whom it may concern:*

Be it known that I, HARRY COMSTOCK, a citizen of the United States, residing at Fulton, in the county of Oswego and State of New York, have invented new and useful Improvements in Pneumatic Tires for Bicycle and other Vehicle Wheels, of which the following is a specification.

My invention relates to a pneumatic tire for bicycles and consists in the peculiarities of construction and novel combinations of parts hereinafter described and claimed.

Heretofore pneumatic or inflatable tires for bicycles have been extremely liable to be punctured and thereby rendered useless in the course of ordinary usage on rough roads and from accidental contact with sharp substances. It is the object of my invention to obviate this objection to such tires and for that purpose I construct my improved pneumatic tire from a raw-hide tube, which may have a canvas coating or covering on one or both sides to exclude dampness, and with this raw-hide tube is combined an air tight rubber covering, preferably vulcanized, and formed with a thickened tread portion, as usual. The raw-hide tube is so tough that it is impossible for it to be punctured by nails or other sharp objects which it may encounter in running over a road. When the raw-hide tube is dry it has a large degree of resiliency and with the attached vulcanized rubber covering or tread it is impervious to dampness decay or puncture and will last many times longer than pneumatic tires of ordinary construction.

In the annexed drawing is illustrated a transverse section of my improved non-puncturable pneumatic tire for bicycles.

Referring to the drawing the numeral 1 designates a raw-hide tube. When a little damp or soft this tube is sufficiently pliable to be readily molded into any shape required and will retain the same when dried. Inside the raw-hide tube 1 is preferably cemented a thin canvas coating 2, and to the outside is cemented a thick canvas coating 3 that effectually excludes dampness and affords a suitable surface for attachment of the outer rubber covering 4, which is preferably vulcanized and forms the tread of the tire. The rubber covering or tread portion 4 is thick on one side as usual and may be cemented or otherwise secured to the hollow portion of the tire in any suitable manner.

A bicycle tire of this construction can be manufactured at comparatively small expense; the annular raw-hide tube which forms the body of the tire is so tough and durable that it will readily resist the effects of hard usage and will not be punctured by contact with such hard and sharp substances as are frequently encountered in passing over rough and uneven roads; while the canvas covering will effectually exclude dampness and enable the raw-hide tube to retain its shape. It will thus be seen that in connection with the ordinary outer covering or tread of vulcanized rubber the raw-hide pneumatic tube furnishes a durable and effective tire. When the rubber tread or outer covering 4 becomes worn it can be easily replaced by a new one that can be suitably secured by cement, or otherwise, to the outside of the raw-hide tube 1 which will outlast several renewals of the outer covering.

This tire is not only cheap, durable and non-puncturable, but possesses a great degree of resiliency and is at the same time much stronger than pneumatic tires of ordinary construction, and cannot be punctured like a pneumatic tire comprising leather. Ordinary leather used in pneumatic tires can be easily perforated, but raw hide is so tough that it is almost impossible for it to be punctured by nails or other sharp objects which may be encountered in traveling on roads.

What I claim as my invention is—

1. A pneumatic bicycle-tire, consisting of a raw-hide tube, a canvas covering for said tube, and a rubber tread applied to the exterior of the canvas covered raw-hide tube, substantially as described.

2. A pneumatic bicycle tire, consisting of a raw-hide tube, a canvas coating cemented to the inside of said tube, a canvas coating cemented to the outside of the said tube, and a rubber tread applied to the canvas covered raw hide tube, substantially as described.

In testimony whereof I have hereunto set my hand and affixed my seal in presence of two subscribing witnesses.

HARRY COMSTOCK. [L. S.]

Witnesses:
   AMOS YOUMANS,
   LANGDON C. FOSTER.